March 31, 1959 H. H. TURNER 2,879,692
MULTIPLE DIRECTION VISUAL MEASURING SYSTEM
Filed Sept. 4, 1956 8 Sheets-Sheet 5

INVENTOR
Harold H. Turner
By Carlson, Pitzner, Hubbard Wolfe
ATTORNEY

March 31, 1959 H. H. TURNER 2,879,692
MULTIPLE DIRECTION VISUAL MEASURING SYSTEM
Filed Sept. 4, 1956 8 Sheets-Sheet 8

INVENTOR
Harold H. Turner
By Carlson, Pitzner, Hubbard & Wolfe
ATTORNEY

United States Patent Office 2,879,692
Patented Mar. 31, 1959

2,879,692

MULTIPLE DIRECTION VISUAL MEASURING SYSTEM

Harold H. Turner, Rockford, Ill., assignor to The Ingersoll Milling Machine Company, Rockford, Ill., a corporation of Illinois Application September 4, 1956, Serial No. 607,819

6 Claims. (Cl. 88—24)

This invention relates to an optical system for accurately measuring the changes in position of a movable support in at least two transverse directions.

One object is to provide an optical system for giving accurate visual indications on a single screen of the positions of a movable element along two paths extending transversely of each other.

A more detailed object is to indicate the position of a support movable along two intersecting paths through the use of measuring scales extending along the respective paths and an optical system having parts selectively adjustable to project a magnified image of either scale onto a single screen.

Another object is to arrange the screen and optical system in a novel location for easy reading of the scales over the full ranges of movement of the support along the two paths.

A further object is to utilize a single source of light in producing the magnified images of the two measuring scales.

Still another object is to associate with each measuring scale a vernier scale arranged for coaction with the main scale in a novel manner throughout the full ranges of the two cross motions.

A further object is to associate each vernier scale with one measuring scale in a novel manner which avoids obscuring of the reading by an accumulation of foreign matter on either scale.

Other objects and advantages of the invention will become apparent upon reading the attached detailed descripion and upon reference to the drawings in which.

In the drawings, the invention is shown incorporated in a machine tool where it is frequently desirable to measure or indicate precisely the positions of a cutter or work support along two crossing paths usually extending perpendicular to each other. The machine tool selected for purposes of illustration is a milling machine comprising generally a bed 10 having horizontal ways 11 slidably supporting a slide 12 having ways 13 extending transversely of the ways 11 and slidably supporting an element 14 whose positions along the perpendicular paths defined by the ways 11 and 13 determine the area of the work (not shown) that will be operated upon by the cutter 15 of the tool. In such milling machines, the cutter spindle is carried by a head 16 slidable along vertical ways 17 on an upright column which thus constitutes the movable element whose position is to be indicated from time to time.

A suitable power actuator for moving the column along either of the two crossing paths at feed and rapid traverse rates may comprise electric motors 18 together with speed reducers, clutches, etc. mounted on the slide 12 for transmitting power selectively to the nuts of feed screws fixed to the bed and column respectively. By selectively operating switches on a pendant 19 of well known construction, an operator standing on a platform 20 carried by the tool head 16 may control the starting and stopping of the various power actuators to move the head up and down along the column, the column transversely of the bed along the slide ways, or the slide along the bedways.

As applied to a machine tool of the above character, the present invention provides a new and improved system for enabling the machine operator standing on the platform 20 to visually observe on a screen 21 the magnified image of a selected one of two linear scales 22 and 23 by which the positions of the column along the bedways and also along the slideways are respectively measured. The screen 21 is arranged in a novel manner in relation to the moving parts so as to permit easy reading of the scale images from the operator's position in all of the different positions of the column along the relatively long bedways 11 and the somewhat shorter slideways 13. For this purpose, the screen is mounted on the slide 12 in a horizontal plane below the platform and the longitudinal and cross scales are fixed to the bed 10 and the column 14 respectively. Herein the scale 22 is disposed in a horizontal plane and attached to the top of a bar 24 supported on the bed 10 below and between the ways 11. The cross scale 23 is disposed in a vertical plane and is attached to the ends of spaced arms 25 secured to and projecting cantilever fashion from the base 26 of the column on the platform side of the latter with the graduations of the scale facing horizontally and away from the column.

Figure 3:
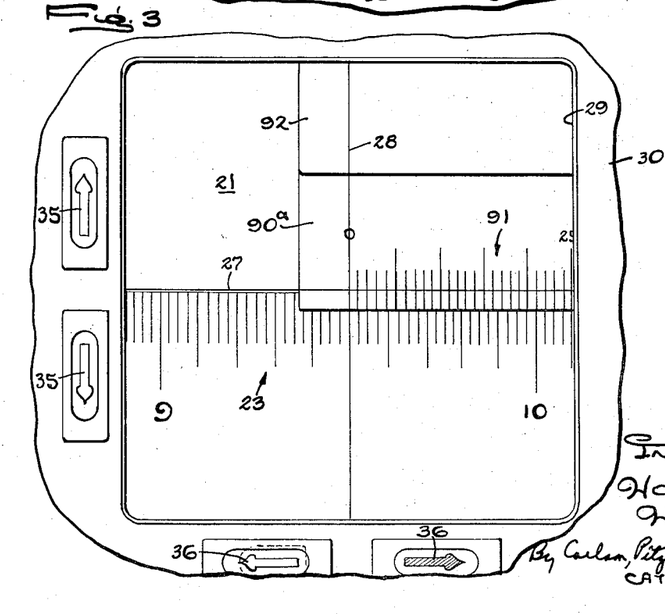
Fig. 3 is a similar view of the screen with the cross scale and vernier projected thereon.
Figure 4:
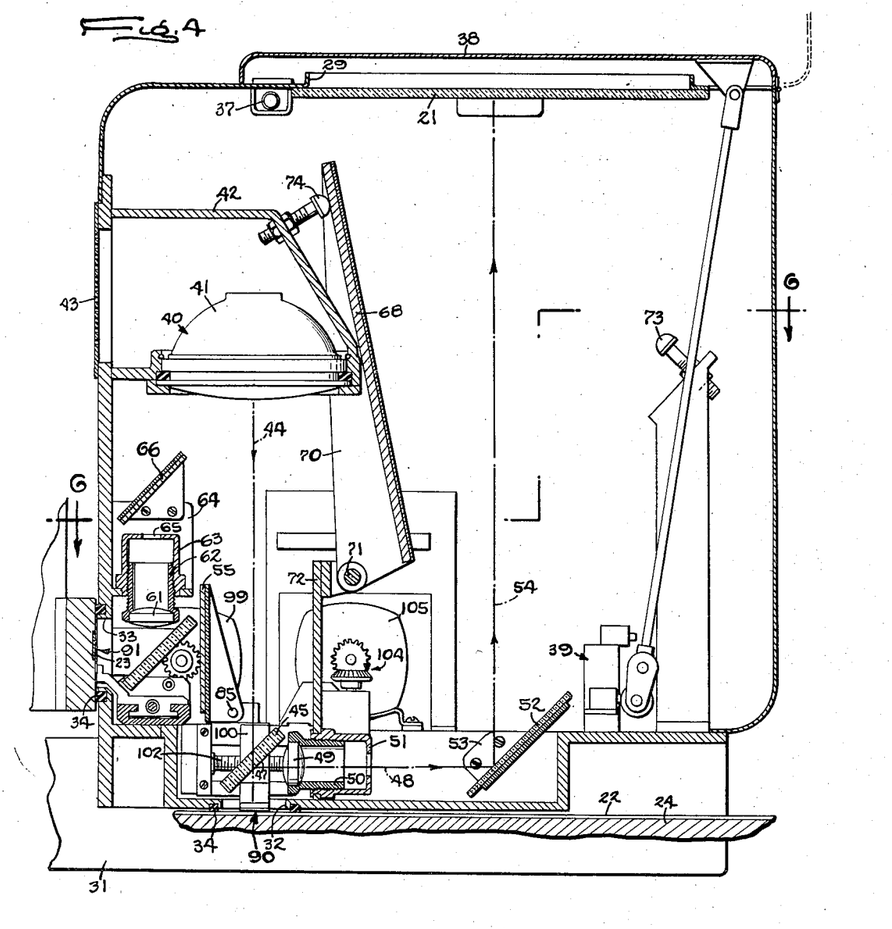
Fig. 4 is a fragmentary sectional view taken along the line 4—4 of Fig. 1.
Figure 10:
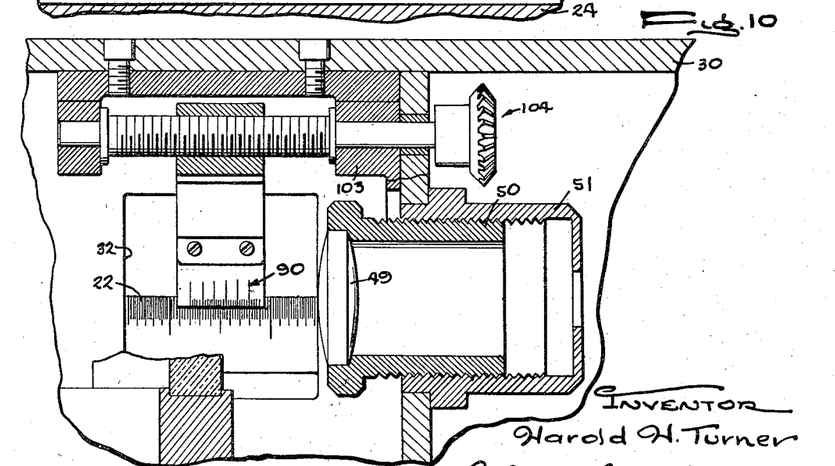
Fig. 10 is a fragmentary section taken along the line 10—10 of Fig. 9.
Figure 11:
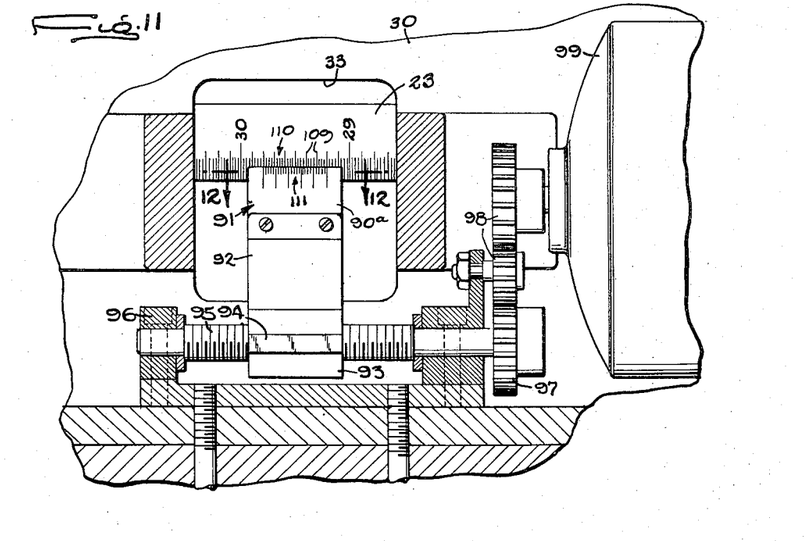
Fig. 11 is an enlarged fragmentary sectional view taken along the line 11—11 of Fig. 6.

The screen 21 comprises a frosted glass plate having crossed hairlines 27 and 28 (Figs. 2 and 3) centered thereon and suitably attached to the underside of the top wall of a box-like housing 30 so as to be visible through an opening 29 (Fig. 4). The box rests on and is secured to the outer ends of horizontal arms 31 attached rigidly to the slide base 26 and projecting from the latter below and beyond the cross scale 23 with the arms straddling the longitudinal scale bar 22. A hole 32 (Figs. 4, 9 and 10) in the bottom of the box registers with the scale 22 while a similar hole 33 (Figs. 4 and 11) registering with the cross scale 23 is formed in a side wall of the box near the bottom thereof. The observed areas of the scales 22 and 23 are preferably enclosed by rings 34 (Fig. 4) of yieldable material set in the box walls and contacting the scale bars so as to wipe off accumulations of oil or other foreign matter.

Along two side margins of the screen the top wall of the box is apertured to provide two pairs of arrow-shaped openings 35 and 36 disposed above electric lamps 37 preferably energized automatically and selectively by switches associated with the pendant switches by which the column 14 is moved along the bed and slideways. The arrows of each pair point in opposite directions along the respective paths of movement of the column so that the lighting of any one arrow indicates to the operator the direction in which the column is being moved.

Figure 1:
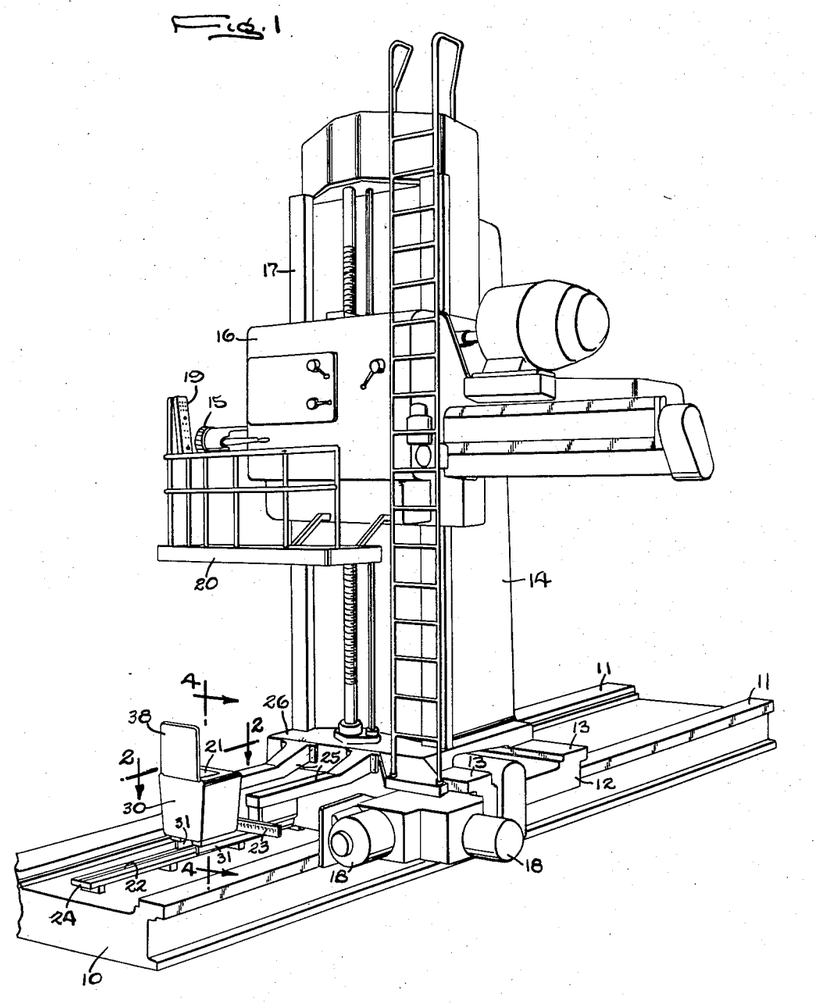
Figure 1 is a perspective view of a machine tool incorporating a visual measuring apparatus embodying the novel features of the present invention.

To protect the screen 21 while the measuring system is not in use, a cover 38 is hinged to the top of the box to swing between the open and closed positions shown in Figs. 1 and 4. Preferably an electric motor driven actuator 39 is provided for enabling the cover to be opened and closed by operating a control switch on the pendant 19.

In accordance with the present invention, the box 30 houses the parts of two optical systems operable selectively from a common light source 40 (Fig. 4) to project a substantially magnified, ten times in the present instance, image of one or the other of the scales 22 and 23 onto the screen which thus serves both optical systems. Herein, a relatively strong source of light is formed by an electric lamp sealed within a casing 41 which is housed within a closure 42 inside the box and ventilated through an opening 43. A beam 44 of light is thus directed downward and vertically from a lens covering the bottom of the lamp casing.

Figure 2:
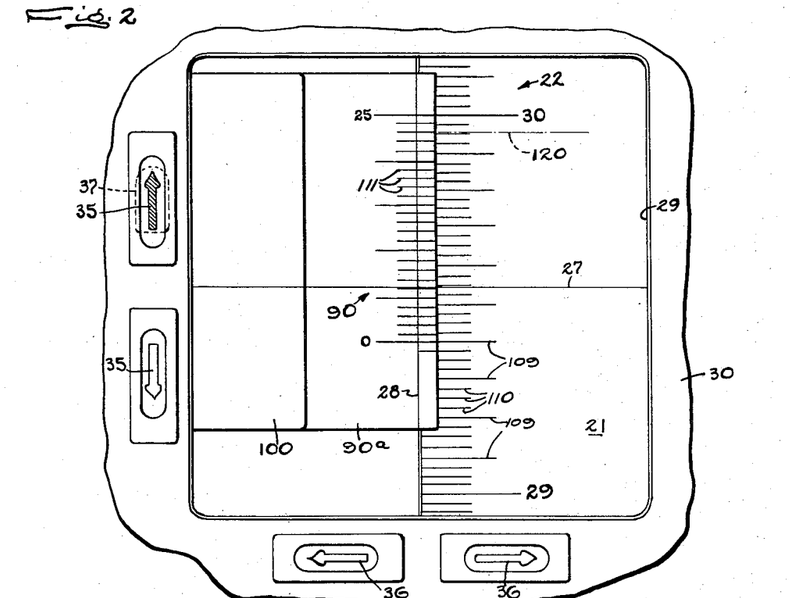
Fig. 2 is a fragmentary top view of the creen of the improved apparatus having the image of one scale and vernier projected thereon.
Figure 6:
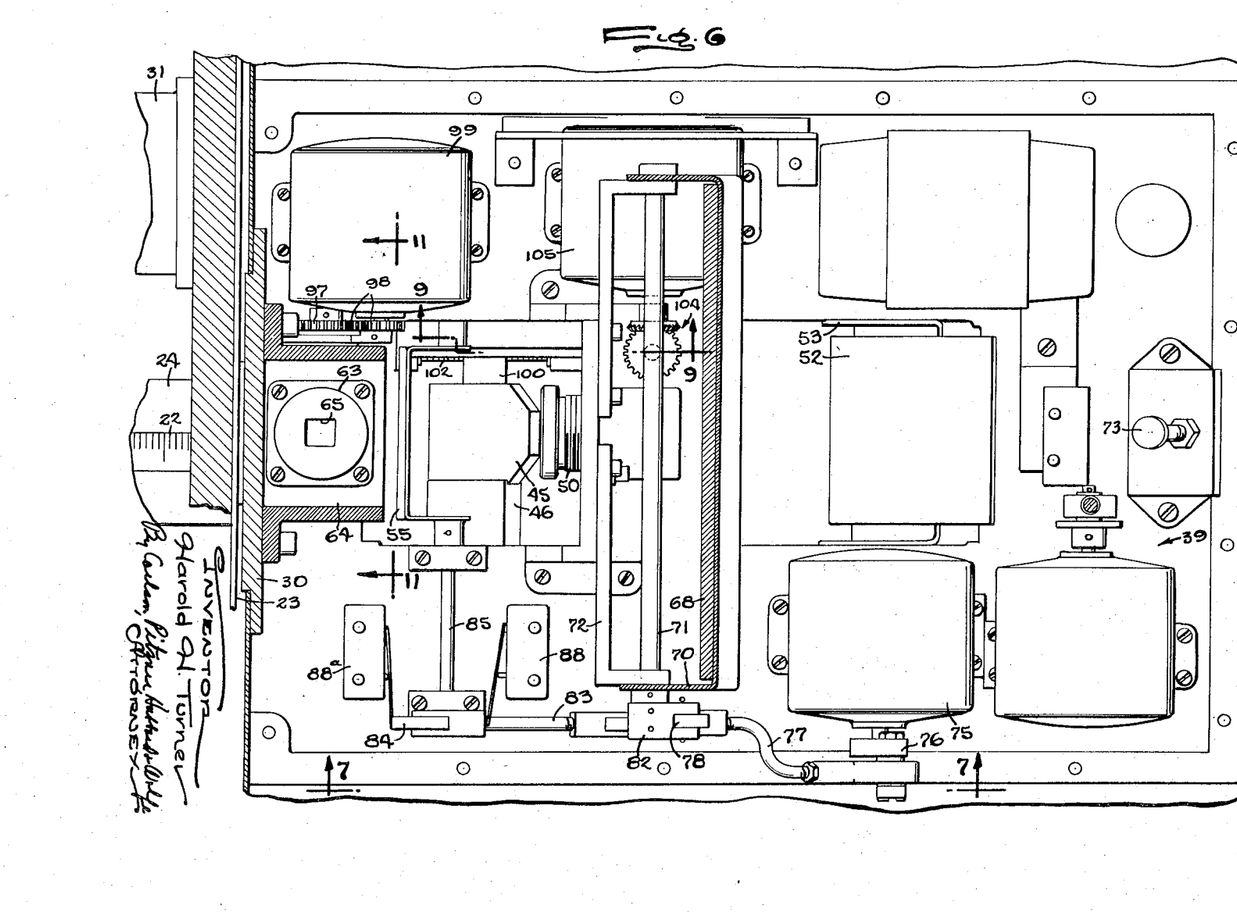
Fig. 6 is a fragmentary sectional view taken along the line 6—6 of Fig. 4.
Figure 9:
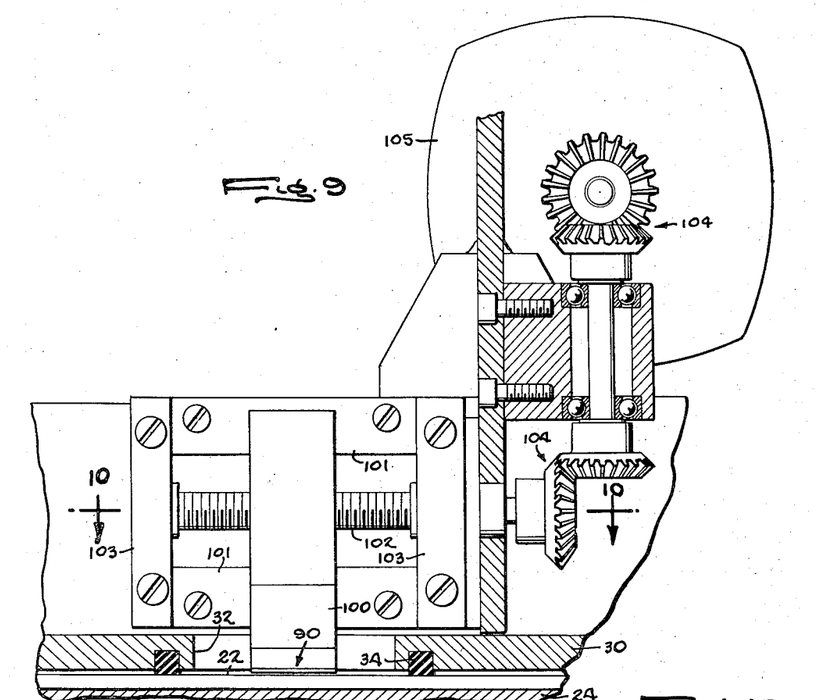
Fig. 9 is a fragmentary section taken along the line 9—9 of Fig. 6.

The system for projecting the image of the longitudinal scale 22 onto the screen includes a so-called beam-splitter 45 (Fig. 4) disposed at a 45 degree angle immediately above the hole 32 through which the scale is exposed. One side edge of the splitter is seated in a groove in a bracket 46 (Fig. 6) upstanding from the bottom of the box 30. The splitter comprises a plate of optical glass ground to a precise thickness so as to be adapted to pass the light beam but to act on its under surface 47 as a mirror for deflecting the reflected image of the scale area horizontally along a line 48. A magnifying lens 49 in a tube 50 is supported for axial adjustment in a cup 51 secured to the box bottom with the lens axis centered on the line 48. The image of the scale area exposed at any time through the hole 32 in the box bottom as shown in Fig. 9 is magnified and brought into sharp focus on a front surfaced mirror 52 mounted in a bracket 53. The 45 degree inclination of this mirror is reversed relative to the splitter surface 47 so that the image is directed upwardly along a line 54 and onto the screen. The image of the scale area is magnified about ten times in the present instance and, as viewed from above the screen, appears as shown in Fig. 2. Since the box 30 and the optical system move with the column and slide along the bedways 11, the scale appears to an observer standing on the platform to move in the same direction as but at a greater speed than the column.

Figure 7:
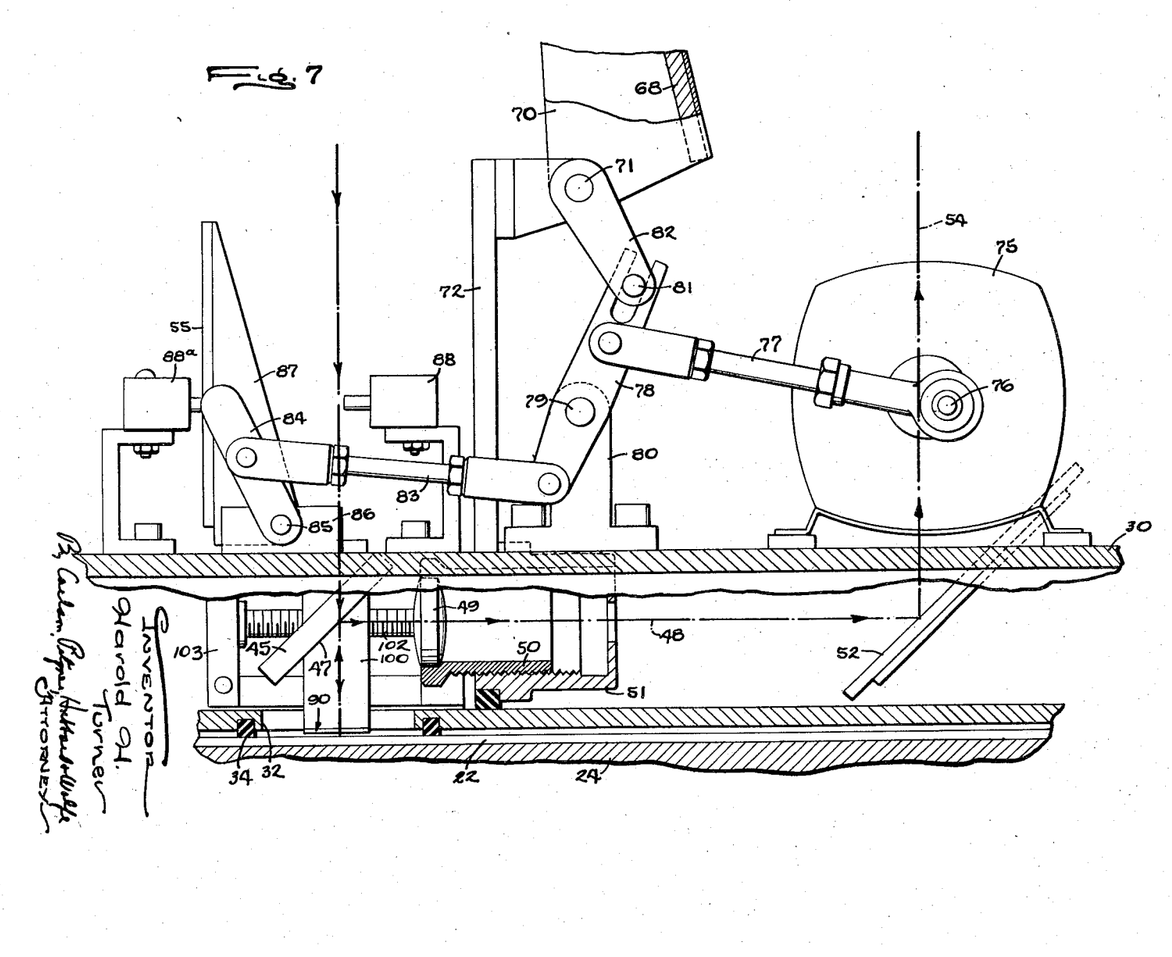
Fig. 7 is a fragmentary sectional view taken along the line 7—7 of Fig. 6.
Figure 8:
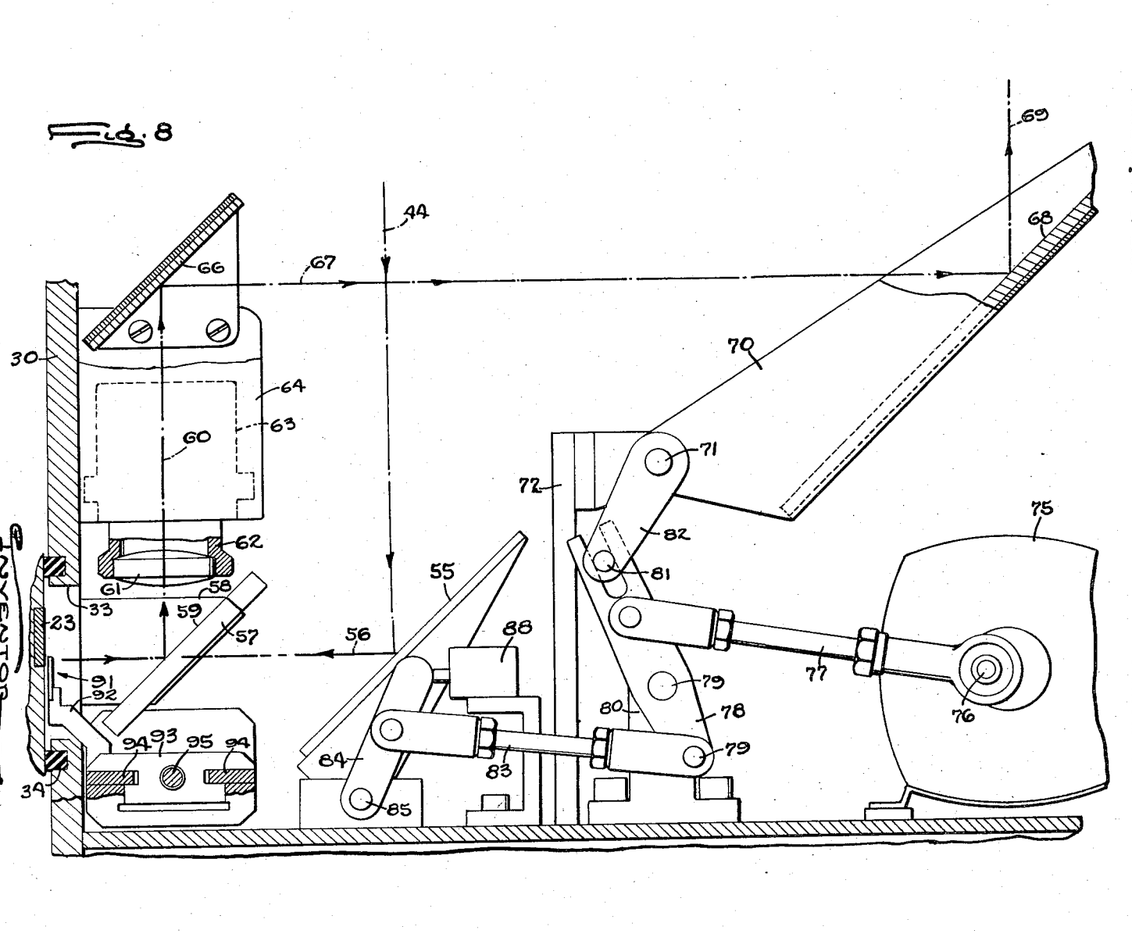
Fig. 8 is a similar view showing another position of the parts.

The elements of the second optical system for projecting an image of the cross scale 23 onto the screen are shown in Fig. 8. This includes a front face mirror 55 swung from a normally inactive position (Figs. 4 and 7) into a 45 degree position (Fig. 8) to interrupt the light beam 44 at its center and reflect the beam horizontally along a line 56 through a similarly inclined beam splitter 57 mounted in brackets 58 on the back wall of the box 30. The center of the splitter is thus disposed on a horizontal line extending through the axis of the hole 33 through which the cross scale 23 is exposed. As in the case of the splitter 45, the splitter 57 permits the reflected light to pass and impinge on the scale 23 while its top surface 59 acts as a reflector to deflect the scale image upwardly along a vertical line 60 and through a magnifying lens 61 in a tube 62. The latter is screwed into a cup 63 mounted on a bracket 64 and is thus adjustable axially for sharp focusing of the image.

The image thus reflected through a hole 65 in the cup is directed against a mirror 66 fixed inside the box and inclined to reflect the image horizontally across the box and along a path 67 which it will be observed extends through the light beam 44. A similarly inclined but upwardly facing mirror 68 is centered on the center line of the screen 21 and thus reflects the magnified image upwardly along a path 69 and against the screen where it appears as shown in Fig. 3 when viewed from the platform 20. The scale image parallels the path of cross motion of the column. Since the scale 23 is carried by the moving element or column 14 whose motion is to be measured, the image of the scale on the screen will appear to move relative to the screen in a direction opposite to that in which the column is moving.

The mirror 68 is fixed to a channel-shaped arm 70 fast on a rockshaft 71 which is journaled on a bracket 72 within the box to permit swinging of the arm and mirror back and forth between the position shown in Fig. 8 in which the arm abuts against an adjustable stop 73 (Fig. 4) and an inactive position (Figs. 4 and 7) against a stop 74. In the latter position, the mirror is disposed out of the way and to the left of the path 54 of projection of the image of the longitudinal scale 22 from the mirror 52 onto the screen. Rocking of the mirror 68 back and forth may be effected by an electric motor 75 (Fig. 7) operating through a suitable speed reducer to turn an eccentric 76 through successive half revolutions. The eccentric follower is on one end of a link 77 pivoted at the other end on the upstanding end of a lever 78 fulcrumed at 79 intermediate its ends on a post 80. The uppermost end of the lever is slotted to receive a pin 81 on an arm 82 fast on and depending from the rockshaft 71.

The other and depending end of the lever 78 is coupled through an adjustable link 83 with an arm 84 fast on a rockshaft 85 journaled on lugs 86 within the box 30. The channel-shaped arm 87 carrying the mirror 55 is fixed to the rockshaft in a position such as to swing the mirror back and forth between the inactive and active positions shown in Figs. 7 and 8 in the successive cycles of the motor 75. These cycles are initiated by closing separate circuits respectively including limit switches 88 and 88ª (Fig. 6) which interrupt the energization of the motor as the arm 70 comes against the limit stops 73 and 74 (Fig. 4). The motor circuits may be associated with the switches on the pendant 19 that control the longitudinal and cross motions of the column 14 so that the selection of the proper optical system for measuring a given motion of the column will be made automatically as an incident to the normal conditioning of the power actuators for effecting such column motion.

To enable the column motions to be measured in fine increments, for example thousandths of an inch, in all positions of the column throughout the full ranges of the two cross motions, vernier scales 90 and 91 are associated with the respective main scales 22 and 23 and, in accordance with another aspect of the present invention, are mounted to move with the two optical systems and also for independent adjustment along the main scales. That is to say, the vernier scale mountings are carried by the box 30 but provide for individual adjustment of these scales relative to the box and along the respective main scales. The bar carrying the vernier scale 91 is fixed to lugs 92 (Figs. 4, 8 and 11) inclined upwardly through the hole 33 from a slide 93 guided on ways 94 secured to the bottom of the box 30. This slide is threaded onto a screw shaft 95 which is journaled in lugs 96 on the box bottom. The screw carries a gear 97 driven through gears 98 from the speed reduced shaft of a reversible electric motor 99 adapted to be controlled from the operator's position on the platform 20.

In a similar way, the bar carrying the vernier scale 90 is attached to the lower end of a block 100 (Figs. 4, 9 and 10) guided in ways 101 on the box and constituting a nut threaded onto a screw shaft 102 which is journaled in lugs 103 on a partition of the box. Through two sets of bevel gears 104 the screw is coupled to the speed reduced shaft of a reversible electric motor 105 by which the vernier scale may be jogged back and forth at a slow rate by manipulating control switches on the pendant 19.

Figure 5:
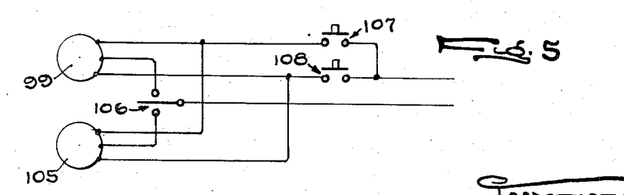
Fig. 5 is a simplified wiring diagram.

As shown schematically in Fig. 5, the vernier actuating motors 99 and 105 are rendered operative selectively by a double throw switch 106 which is shifted from one position to the other automatically as an incident to the conditioning of the power actuators for producing either a longitudinal or a cross motion of the column 14. Then, by manipulating suitable push button switches 107 and 108, the selected vernier scale may be shifted endwise. These switches are located on the pendant 19 so that the operator may adjust the position of either vernier while viewing the screen 21 from the platform 20.

The marks on the main and vernier scales may be spaced apart as desired but correlated with each other in a well known manner to subdivide the graduations on the main scales and give the desired accuracy of the measurement. For example, the scale 22 may be divided into inch increments which are subdivided by marks 109 (Fig. 2) into tenths of an inch. Each tenth is divided into four parts by marks 110 which are thus spaced apart .025 of an inch. With the scale thus graduated, the vernier scale 90 is made .6 of an inch long and is divided by marks 111 into 25 increments over a length of the scale 22 including 24 of the .025 increments. Each increment on the vernier scale thus represents .001 of an inch.

With the main and vernier scales thus graduated and magnified on the screen, it will be apparent that the operator may, by manipulating the pendant control buttons in the usual way, easily jog the column to within one tenth of an inch of a desired position. Then, by adjusting the associated vernier in the usual way, the column may be jogged to a desired final position with an accuracy of a thousandth of an inch. The vernier 91 for the cross scale 23 is similarly graduated for measuring the cross motions of the column in thousandths of an inch.

To illustrate the manner of using the measuring system above described, let it be assumed that the column 14 is positioned along the bed 10 29.550 inches away from a zero or reference point and that it is desired to position the column 29.957 inches from such point. The operator standing on the platform 20 would first operate switches on the pendant 19 to condition the circuits for operation of the motors 18 to advance the slide 12 to the left as viewed in Fig. 1. As an incident to this, the lamp of the upper arrow 35 is lighted thus indicating the contemplated direction of travel of the slide and column. This also operates the switch 106 (Fig. 5) to condition the vernier motor 105 for operation and further energize the motor 75 to move the mirrors 55 and 68 to the inactive positions shown in Fig. 7 so that the images of the main and vernier scales 22 and 90 appear on the screen 21 as shown in Fig. 2.

The switch 107 on the pendant is then closed to energize the motor 105 and advance the vernier scale 90 along the scale 22 until the zero of the vernier registers with the hairline 27. This conditions the vernier for proper coaction with the main scale in whatever position the slide 12 is subsequently stopped along the bedways. Next, the actuators 18 are energized to slowly advance the slide 12 and move the screen 21 along the scale 22 until the reference line 27 reaches or comes close to the position indicated at 120. The column is then approximately 29.95. Its exact location may then be determined by observing the vernier scale to determine which of the marks 111 matches a mark 110 on the main scale. Finally, the slide is jogged in one way or the other to bring the particular vernier line 121 into alinement with a line 110 on the scale 22.

The mounting of the vernier scales on the box 30 and also for fine adjustment relative to the latter contributes further to the versatility of the improved measuring system in service use. For example, after taking a cut across the work, it may be found, as is frequently the case, that the machined surface is only 29.955 inches away from the reference point thus making it desirable to reset the column and advance the cutter an additional .002 of an inch. This may be accomplished simply and conveniently by observing the reference line 27 and vernier scale 90 and jogging the column ahead through two increments on the vernier scale.

Figure 12:
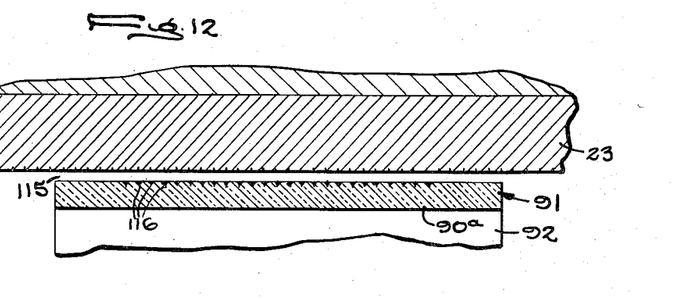
Fig. 12 shows a portion of Fig. 11 on an enlarged scale.
Figure 13:
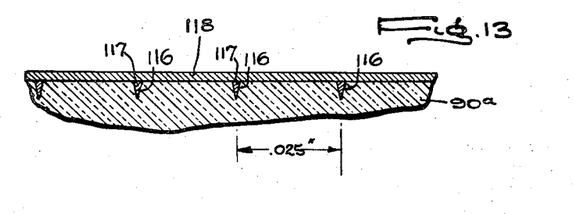
Fig. 13 is an enlarged view of a portion of Fig. 12.

In vernier measuring systems of the above character, the bar carrying the vernier scale is usually disposed in sliding contact with the bar carrying the main scale. Any accumulation of oil or other foreign matter at the junction between the two scales so mounted would, with the substantial magnification contemplated in the present instance, so blur the image projected onto the screen 21 as to preclude accurate reading of the vernier adjustment. To obviate this difficulty, the invention contemplates the disposal of the main and vernier scales in overlapping relation but separated by a gap 115 (Fig. 12) for example, .015 of an inch, of greater thickness than any film of oil or the like likely to come and be retained on the graduated surface of the main scale 23. In addition, the bar 90ª carying the vernier scale is made of transparent material and the marks 111 are formed on the side adjacent the main scale so as to minimize the separation of the marks of both the main and vernier scale in the direction of projection of their images, both marks thus remaining in sharp focus on the screen 21.

Marks of the above character may be formed on the transparent vernier bar 90ª by cutting V-shaped grooves 116 (Fig. 12) in the surface adjacent the main scale bar 23 and filling these grooves with blackening material 117. Thereafter the filled grooves and the entire under surface of the vernier bar are covered with a coating 118 (.0003 inch) of silver or the like thereby making more distinct the vernier marks formed by the grooves 116 as they appear on the screen 21.

I claim as my invention:

1. Position indicating apparatus having, in combination, a base, a slide mounted on said base for back and forth movement along a predetermined first horizontal path, a support mounted on said slide for back and forth movement relative thereto along a second horizontal path extending transversely of said first path, a box-like housing carried by said slide above said base and having an image screen in the top wall of the housing, a measuring scale disposed in a horizontal plane and mounted on said base and beneath said housing with the scale graduations spaced along said first path, a similar scale disposed in a vertical plane and mounted on said support between said housing with the scale graduations facing the housing and spaced along said second path, holes in the bottom and side walls of said housing opposite said scales, a source of light within said housing, means selectively adjustable to direct a beam of light from said source through either one of said holes and against the adjacent scale, separate lens and reflector systems within said housing for focusing the images of the lighted scale areas and projecting the same along different paths onto a common area of said screen, and selectively operable means for directing a beam of light from said source through one of said holes onto one of said scale areas and simultaneously rendering the corresponding one of said lens systems operative for projecting the image of the selected scale area onto said screen.

2. Position indicating apparatus having, in combination, a base, a slide mounted on said base for back and forth movement along a predetermined first horizontal path, a support mounted on said slide for back and forth movement relative thereto along a second horizontal path extending transversely of said first path, a box-like housing mounted on said slide above said base and carrying an upwardly facing image screen, a measuring scale mounted on said base adjacent said housing with the scale graduations facing the housing and spaced along said first path, a similar scale mounted on said support adjacent said housing with the scale graduations facing the housing and spaced along said second path, holes in said housing opposite said scales, a source of light within said housing, means selectively adjustable to direct a beam of light from said source through either one of said holes and against the adjacent scale, separate lens and reflector systems within said housing respectively operable to project an image of the lighted area of the selected scale onto a common area of said screen.

3. Position indicating apparatus having, in combination, a base, a slide mounted on said base for back and forth movement along a predetermined first path, a support mounted on said slide for back and forth movement relative thereto along a second path extending transversely of said first path, a housing carried by and movable with said slide and having an image screen facing in a direction generally transversely of both of said paths, a measuring scale mounted on said base adjacent said housing with the graduations thereof spaced along said first path, a second similar scale mounted on said support adjacent said housing with the graduations thereon spaced along said second path, and an optical system within said housing selectively adjustable to focus on either of said scales in all of the positions of said support and slide and to project an enlarged image of the selected scale on said screen.

4. Position indicating apparatus having, in combination, a base, a slide mounted on said base for back and forth movement along a predetermined first path, a support mounted on said slide for back and forth movement relative thereto along a second path extending transversely of said first path, power actuators for moving said slide along said base or said support along said slide, a housing carried by said slide and having an upwardly facing image screen, a measuring scale mounted on said base adjacent said housing with the graduations of the scale spaced along said first path, a second similar scale mounted on said support adjacent said housing with the graduations thereon spaced along said second path, a member mounted on said support for movement toward and away from said slide and base and providing a changing point of observation for viewing said screen, an optical system within said housing selectively adjustable to focus on either of said scales in all of the positions of said support and slide and to project an enlarged image of the selected scale onto said screen, and a panel adjacent said observation point having means thereon operating to control said actuators for moving said slide or support in a selected direction and for adjusting said optical system to bring the corresponding scale into focus on said screen.

5. Position indicating apparatus having, in combination, a base, a slide mounted on said base for back and forth movement along a predetermined first path, a support mounted on said slide for back and forth movement relative thereto along a second path extending transversely of said first path, a housing carried by said slide and having an image screen, a measuring scale mounted on said base adjacent said housing with the graduations of the scale spaced along said first path, a second similar scale mounted on said support adjacent said housing with the graduations thereon spaced along said second path, an optical system within said housing selectively adjustable to focus on either of said scales in all of the positions of said support and slide and to project an enlarged image of the selected scale onto said screen, and vernier scales disposed alongside the respective first and second scales for coaction thereof and mounted on said housing for individual endwise adjustment relative thereto.

6. Position indicating apparatus having, in combination, a base, a slide mounted on said base for back and forth movement along a predetermined first path, a support mounted on said slide for back and forth movement relative thereto along a second path extending transversely of said first path, a housing carried by said slide and having an image screen, a measuring scale mounted on said base adjacent said housing with the graduations of the scale spaced along said first path, a second similar scale mounted on said support adjacent said housing with the graduations thereon spaced along said second path, an optical system within said housing selectively adjustable to focus on either of said scales in all of the positions of said support and slide and to project an enlarged image of the selected scale onto said screen, vernier scales lying alongside said first and second scales for coaction therewith, means on said housing supporting said vernier scales for individual endwise adjustment relative to the housing, and individual power actuators for said vernier scales mounted on said housing and controllable from a point exteriorly thereof.

References Cited in the file of this patent

UNITED STATES PATENTS

| | | |
|---|---|---|
| 1,775,952 | Turrettini | Sept. 16, 1930 |
| 1,974,606 | Fassin | Sept. 25, 1934 |
| 2,241,691 | Williams | May 13, 1941 |
| 2,332,810 | Place | Oct. 26, 1943 |
| 2,460,350 | Hinman | Feb. 1, 1949 |

FOREIGN PATENTS

| | | |
|---|---|---|
| 635,316 | Germany | Sept. 15, 1936 |
| 559,022 | Great Britain | Feb. 1, 1944 |